April 14, 1964
A. R. GUDHEIM
3,129,132
TREATMENT OF LATEX
Filed April 14, 1960
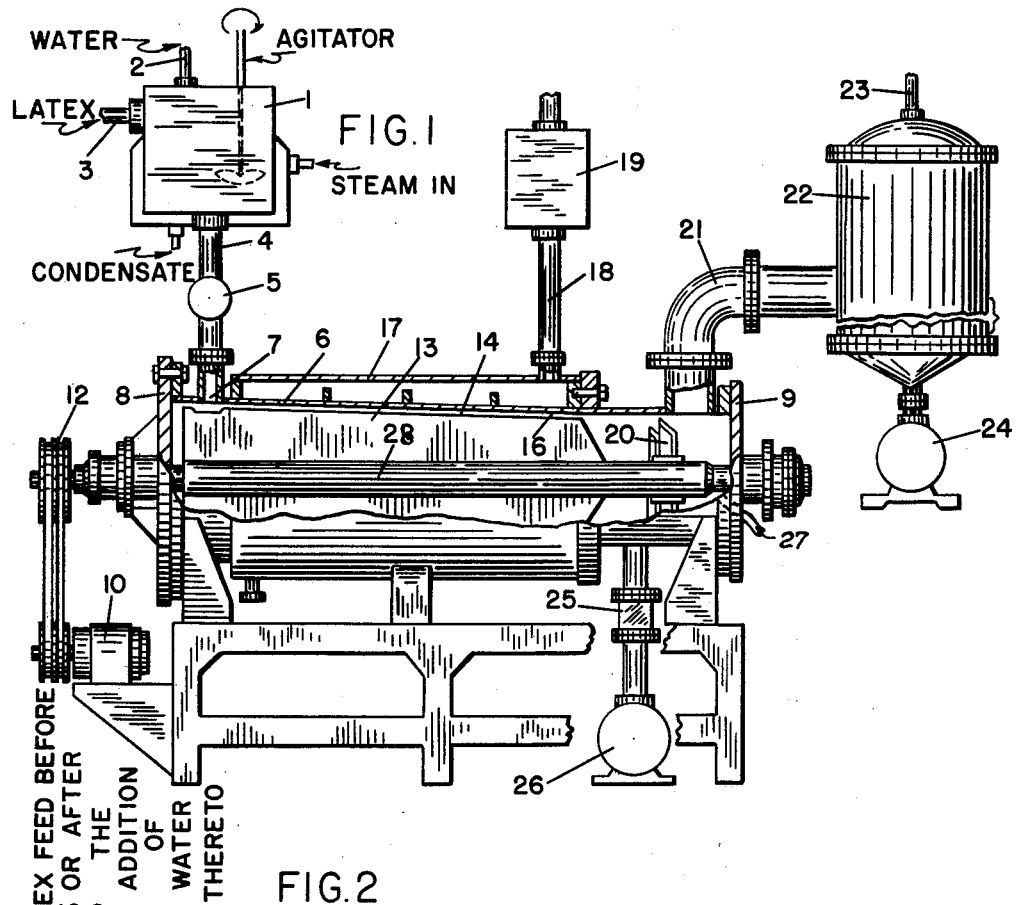
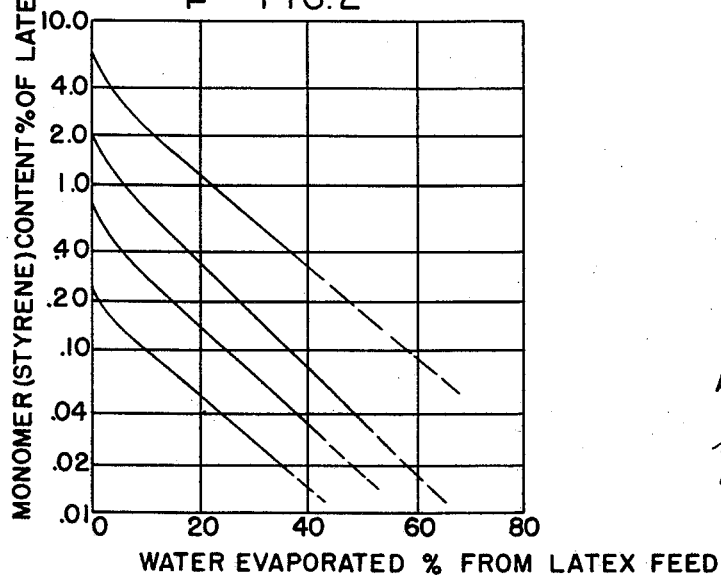
INVENTOR
ARNE R. GUDHEIM
ATTORNEY United States Patent Office 3,129,132
Patented Apr. 14, 1964

3,129,132
TREATMENT OF LATEX
Arne R. Gudheim, N. Main St., Petersham, Mass.
Filed Apr. 14, 1960, Ser. No. 22,298
1 Claim. (Cl. 159—49)

The present invention relates to the treatment of latices and more particularly to the removal of monomers and water therefrom.

When forming synthetic latices, varying amounts of monomers as butadiene and styrene are usually left in the material. For many uses, these must be almost completely removed. This has been a difficult operation. Monomers having comparatively low boiling points as butadiene are less difficult to take out, but those with relatively high boiling points as, for example, styrene are most difficult to reduce below 0.1% by existing methods.

Heretofore, latex has generally been stripped of these monomers in two different ways. First, in a batch procedure by blowing steam through a large vessel containing the latex and then condensing the monomer and water vapors removed therefrom. This method usually requires many hours with the latex at elevated temperatures, which tends to lower its quality. Furthermore, it is quite difficult to reduce the styrene content as much as now desired by this procedure. In addition, there is a tendency with this method to dilute or lower the latex solids content, especially so with those latices that must be steamed for an unusually long period of time to obtain the desired reduction.

Monomer reduction has also been accomplished in a continuous manner by having latex flow counter-currently to blowing steam in modified stripping columns. Satisfactory reduction can usually be obtained by this means without impairing the quality, but it is quite difficult to clean the equipment involved when this is required. Furthermore and as is also the case with the batch procedure, it is not feasible to concentrate the latex solids at the same time in this manner.

Heretofore, latices have also been generally formed so as to have solids contents in the range 20-45%. The number of applications where it is advantageous to use such materials having solids of 60-65% is increasing, and to the point where it appears to be becoming a definite commercial requirement. This is now being accomplished to a degree in a semi-continuous manner by circulating the latex through a heat exchanger so as to elevate its temperature, and then allowing the heated material to expand into a vacuum operated vessel where some of the moisture is flashed off. The then partially concentrated latex is recirculated through the heat exchanger and the operation continued until the desired solids content is obtained.

This procedure, likewise, has the disadvantage of requiring considerable time with an accompanying tendency for a lowering of the quality. There is the further limitation that the heat exchanger tends to become fouled and in turn to need cleaning. In general, it is not feasible with this procedure to use blowing steam to simultaneously reduce the monomer content and normally, the amount of water evaporated to increase the solids content is insufficient for more than modest reductions of the styrene type monomers.

The principal object of the present invention is to provide a unique method for the virtual complete removal of monomers such as butadiene and styrene from latex accompanied by the simultaneous concentration of the solids up to about 70% when desired.

Another object is to provide a continuous process for stripping the monomers.

Another object is to provide a stripping method whereby the latex is in process only a very short time so as to have a minimum influence on the quality.

Still another object is to provide a procedure together with the preferred apparatus to permit controlling the thickness of the latex film in the apparatus for most effective monomer reduction.

A further object is to provide a method together with the preferred apparatus to prevent developing "dry spots" on the heated wall of the apparatus and in turn, "burn-on."

Another object is to provide a procedure together with the preferred apparatus for concentrating latices in a single, positive, short-time pass.

A still further object is to provide a method together with the preferred apparatus for quickly solvent-cleaning the heat transfer surface of the apparatus when this is required without dismantling the heating apparatus.

These and other objects and advantages reside in novel features and in steps and processes, as will hereinafter be more fully set forth and pointed out in the appended claims.

Reference is to be had to the accompanying drawings, in which

FIGURE 1 is a diagrammatic elevational view of one form of apparatus for carrying out the present invention, parts being cut away and in section; and FIGURE 2 is a graph illustrating the general relation between the amount of water evaporated from the latex feed before or after the addition of water thereto and the styrene reduction for latices treated in the preferred apparatus.

In illustrating the present invention, the same has been shown as a process carried out by the construction of the thin film heat exchanger apparatus as shown and described in my United States Patent No. 2,927,634 which is essentially illustrated in FIG. 1.

However, in brief, the apparatus of FIG. 1 comprises a feed tank or supply which is usually agitated for the untreated latex. This is indicated by the reference numeral 1 and may be referred to as an "agitator" or feed tank where water can be metered in with the latex when desired as for instance by means of a water inlet pipe at 2. This tank may also be provided with a surrounding heating jacket. The latex is metered in through an inlet pipe at 3. The latex is to be treated passes through a pipe 4 and a metering valve 5 into the interior of the thin film heat exchanger chamber. This is preferably made in the form of a frusto-conical wall 6 into which the pipe 4 forms an entryway as at 7 and the wall 6 is closed at the ends by means of the head plates 8 and 9. These plates form bearings or journals for an axial shaft 28 extending from end-to-end of the chamber and driven as by a motor 10 through any kind of gearing or the like 12. The shaft 28 is provided with a series of radial blades 13 each of which has a free edge indicated at 14 located in close proximity to the interior surface 16 of the frusto-conical chamber.

The heating or cooling jacket generally indicated at 17 is supplied through a pipe or the like 18 having a control 19 as may be desired therefor, but in any event it will be clear that the jacket 17 is useful to either cool or heat the area in which the blades 13 are provided. The blades 13 preferably have the edges 14 thereof in close proximity and parallel to the relatively inclined inner surface 16 of the frusto-conical chamber 6.

The reference numeral 20 indicates separator blades mounted on shaft 9 and these are used to centrifugally separate foam or any entrainment from the vapor as will appear hereinafter. From the separator the vapor is led through a pipe 21 to a condenser 22 which may be supplied with cooling water by means of a pipe or the like at 23. There is a pump indicated at 24 by which means the vapor in the condenser may be withdrawn but other means than the pump 24 may be used as for instance a barometric leg or the like as is well known in the art.

The treated end product is forced from the apparatus past revolving blades 20 through a sight glass 25 by means of a pump 26 or other means.

It will be seen that the material to be processed enters the chamber at 7 and is either forced in by some pressure means not shown or is sucked in by the vacuum which prevails in the chamber due to the rapid rotation of the blades, or a separate vacuum source may be used also as at 27. Immediately upon entering the chamber, the latex is centrifugally wiped on the heat transfer surface 16 by the revolving blades 13 and the latex is forced through the unit by the vacuum occasioned by the directional force applied thereto by the blades or by the vacuum source. As the latex moves through the apparatus, the necessary quantity of water is evaporated to reduce the monomer content to the desired level while simultaneously obtaining the desired solids content.

The water and monomer vapors leave the thin film surface 16 and co-currently with flow of latex within the unit pass along the open spaces between the rotor blades through the centrifugal separator 20 where any foam or entrainment is knocked out and thence to the condenser supplied by water where the vapors are liquified. The liquified vapors together with the water applied to the condenser is withdrawn by pump 24, etc.

The monomer stripped or concentrated latex is forced from the chamber by the revolving blades through the sight glass 25 and then into and through pump 26 where it is withdrawn as an end product. This completes the processing cycle.

It will be seen that this apparatus is horizontal and that the frusto-conical surface 14 gradually reduces in diameter from the input end of the apparatus 7 to the output end thereof. This may be referred to as a "reverse taper" which produces a vector component of the centrifugal pressure developed by the rotating blades which assures the latex traveling along the chamber in a thin-film with the assurance the entire area will be wetted irrespective of the amount of water evaporated therefrom.

There are several distinctive features of the preferred apparatus which make it best suited for carrying out the invention. First is the co-current movement of the vapors and the latex within the unit. This means that the vapors remain at about the same temperature as the latex therein until they pass into the condenser, thus avoiding any tendency for the higher than water boiling monomers as styrene to condense in the apparatus and be returned to the latex. In other forms of thin-film apparatus, where the vapors and the latex flow counter-currently to each other, there is a definite tendency for some of the vaporized styrene to condense in passing through the colder feed zone, thus preventing efficient reduction of the monomers.

Another feature of the preferred apparatus is that the latex is prevented from coming into contact with the shaft seals or bearings at either end of the rotor and in turn, bring about coagulation thereon of the latex solids. Most latices are reasonably unstable, that is, their rubber-like solids tend to separate from the water emulsion and coagulate when subjected to mechanical motion, as around bearings or shaft seals. This can be a most serious commercial limitation.

The centrifugal action of the horizontal blades in the preferred apparatus prevents the latex contacting the shaft seals and bearings. In contrast, it is virtually impossible to keep the latex from coming into contact with the bottom shaft seal on other, vertically mounted thin-film machines.

The most significant feature of the preferred apparatus, however, is its ability to prevent "dry spots" on the heated wall and in turn, developing "burn-on," irrespective of the amount of water removed from the feed in a single, rapid, positive pass.

As may be understood from FIG. 2, some latices may contain so much styrene, for example, as to necessitate the addition of very considerable quantities of water prior to treatment to permit sufficient evaporating to obtain the desired monomer reduction. This requirement is complicated by the fact that it is generally impractical to concentrate latices above about 65% solids.

Virtually any degree of evaporation per pass can be achieved in the preferred apparatus without danger of developing "dry spots" and in turn "burn-on." Actually, the reverse taper feature of the heating cone with close fitting, rotating blades results in a modest vector component of the centrifugal force being exerted towards the feed. This, in turn, causes a slight hydraulic back pressure on the feed so as to always insure the thin space between the tips of the rotating blades and the cone being full of liquid irrespective of the feed rate or the degree or amount of evaporation. In turn, the slightly greater pressure on the feed due to the pump, etc. overcomes the centrifugal back pressure causing the latex to move through the machine in a controlled and predetermined manner with full and assured wetting of the heating surface. This unique feature of the preferred apparatus results in assured and full turbulence of the latex film throughout the length of the heating section, assuring superior thermal performance.

Another important commercial advantage of the preferred apparatus is the ability to quickly clean the interior of the machine with only a few gallons of a suitable solvent without taking out the rotor. Although all latices are prone to coagulation, they vary greatly in this respect. For example, some latices can be continuously treated for weeks as described herein without the apparatus requiring cleaning, whereas others are such to necessitate cleaning the apparatus daily or more frequently.

One of the more important aspects of this invention is the discovery that unexpected and superior monomer reduction can be obtained by the evaporation of water from the latex and that such reduction is generally proportional to the amount of water evaporated, as FIG. 2 shows. In contrast, it is the usual practice to employ blowing steam in such stripping operations. A suggested explanation for the unexpected reduction obtained when removing water is that a portion of such evaporation occurs so-to-speak from within the rubber-like particles, bringing monomers along at the same time. On the other hand, blowing steam can generally be expected to remove only the monomer which it contacts on the surface of the rubber particles.

Still another aspect of this invention is that monomer reduction and solids concentration can be made to occur simultaneously. In fact and from an economical standpoint, this is desirable whenever the requirements are such as to require this.

The logarithmic graph, FIGURE 2, depicts the monomer reduction measured as styrene with respect to the percent of feed evaporated as water by the new process. As can be seen, the amount of evaporation depends not only on the desired final monomer content but also on the starting value.

As examples from the graph, when one desires to produce 0.02% styrene content finished latex from 2.0% starting material, approximately 60% of the feed must be evaporated as water. In contrast, with 0.2% styrene starting feed, only about 35% of the original latex need be evaporated as water.

Most currently manufactured latices become quite stiff and viscous when their solids contents exceed 60–70% and so much so as to render them unsuitable for handling with thin-film equipment such as that described here. Consequently, when the amount of water that should be evaporated from the latices to produce the desired finished monomer content is such as to cause the solids contents to exceed about 60% after the desired amount of evaporation, water is added to the latex prior to the evaporation step.

The amount so added is usually such as to yield latices having solid contents of 58–60% after the desired quantity of water has been evaporated although larger amounts can be added if it is preferred to produce materials exhibiting the desired monomer reductions with lower solids contents.

Typical operating data for three different unstripped-unconcentrated latices are as follows:

(1) In this case, it was desired to reduce the styrene content to 0.05% with no concentration of the solids.

Feed:

| | |
|---|---|
| Solids content _____ percent__ | 45 |
| Styrene content _____ do____ | 0.20 |
| Temperature _____ | Room |

From FIG. 2, it is estimated 20% of the feed must be evaporated to achieve the desired reduction. Twenty parts of room temperature water (treated) was, therefore, added to 80 parts of the latex prior to treatment.

Corrected feed:

| | |
|---|---|
| Solids content _____ percent__ | 36 |
| Styrene content _____ do____ | 0.16 |
| Temperature _____ | Room |

Preferred apparatus:

| | |
|---|---|
| Feed rate (corrected) _____ lbs./hr__ | 6,000 |
| Absolute pressure _____ mm__ | 50 |
| Vapor _____ °F__ | 100 |
| Product _____ °F__ | 100 |
| Heating steam _____ °F__ | 250 |
| Solids content _____ percent__ | 45 |
| Styrene content _____ do____ | 0.05 |

(2) In this case, it was desired to concentrate the solids content to 60%, disregarding any influence on the monomer content.

Feed:

| | |
|---|---|
| Solids content _____ percent__ | 20 |
| Temperature _____ | Room |

As monomer reduction is not a factor, it was only required to evaporate sufficient water to yield the desired solids content. Consequently, no water adjustment of the feed was needed.

Preferred apparatus:

| | |
|---|---|
| Feed rate _____ lbs./hr__ | 1,560 |
| Absolute pressure _____ mm__ | 50 |
| Vapor _____ °F__ | 100 |
| Product _____ °F__ | 100 |
| Heating steam _____ °F__ | 250 |
| Solids content _____ percent__ | 60 |

(3) In this case, it was desired to simultaneously reduce the styrene content to 0.05% and concentrate the solids to 60%.

Feed:

| | |
|---|---|
| Solids content _____ percent__ | 50 |
| Styrene content _____ do____ | 0.20 |
| Temperature _____ | Room |

Again from FIG. 2, it is estimated 20% of the feed must be evaporated to secure the desired monomer reduction. If this amount is removed from the original feed alone, the solids content would be about 62.5%, or above that desired. Consequently, some water must be added to the feed prior to the treatment. A sufficient amount must therefore, be added to permit removing at least 20% (original basis) of the feed while producing latex having 60% solids. It is calculated the addition of 4 parts of water (treated) to 96 parts of latex will meet the requirements.

Corrected feed:

| | |
|---|---|
| Solid content _____ percent__ | 48 |
| Styrene content _____ do____ | 0.19 |
| Temperature _____ | Room |

Preferred apparatus:

| | |
|---|---|
| Feed rate (corrected) _____ lbs__ | 6,000 |
| Absolute pressure _____ mm__ | 60 |
| Vapor _____ °F__ | 100 |
| Product _____ °F__ | 100 |
| Heating steam _____ °F__ | 250 |
| Solid contents _____ percent__ | 60 |
| Styrene content _____ do____ | 0.05 |

Latices having initial monomer (styrene) contents of 2–4% or below can usually be treated so as to obtain the desired reduction in a single pass. So much water usually has to be added prior to the treatment to those having styrene contents above this range that it is often more effective to perform the operation in two steps.

On the other hand, latices having virtually any initial solids content can be concentrated to the desired degree in a single pass.

Latices having lower monomer contents can be produced by the novel concurrent vapor flow procedure herein described, than by the prior art, countercurrent vapor flow method. This is because with the latter procedure the lower boiling water and higher boiling styrene vapors generated due to the application of heat must go through the colder feed zone in being withdrawn from the unit and in so doing, some of the higher boiling styrene is condensed, then re-evaporated, etc. with an equilibrium styrene content being established as a result thereof below which it is difficult, if not impossible, to reduce the monomer content of the treated latex by the countercurrent vapor flow method.

In contrast, with the present concurrent procedure, the vapors do not go through the colder feed zone and instead, tend to increase in temperature in passing out of the unit. In so doing, additional amounts of styrene are removed thereby producing latices having lower monomer contents.

From the foregoing, it will be apparent that it is possible to accomplish the objects of my invention and provide an improved method for removing the monomers and concentrating latices with a minimum influence on their quality factors.

Various changes can be made in the apparatus, and different forms of feed and removal equipment, heating devices and controls may be used without departing from the spirit of the invention or the scope of the appended claims.

Having thus described my invention and the advantages thereof, I do not wish to be limited to the details herein disclosed, otherwise than as set forth in the claim, but what I claim is:

The process for removing monomers from latices by the addition of liquid thereto only when the solids content thereof exceeds approximately sixty percent to seventy percent, followed by the evaporation of water therefrom in a horizontal chamber, comprising passing the latex through said chamber concurrently with the flow of the vapors, agitating or scraping said latices to form a thin turbulent film on the wall of said chamber, applying vacuum to said chamber to maintain said chamber at a pressure of about 10 mm. to 400 mm. Hg absolute, applying heat to said chamber to cause evaporation of liquid and monomers therefrom, and separating the vapors from the liquid latices.

References Cited in the file of this patent

UNITED STATES PATENTS

| | | |
|---|---|---|
| 1,420,643 | Mabee | June 27, 1922 |
| 2,576,496 | Ziegler | Nov. 27, 1951 |
| 2,857,962 | Rogers | Oct. 28, 1958 |
| 2,927,634 | Gudheim | Mar. 8, 1960 |